United States Patent Office 3,497,474
Patented Feb. 24, 1970

3,497,474
PROCESS FOR THE PREPARATION OF POLYESTERS OF TEREPHTHALIC ACID AND GLYCOLS
Lambert Gaston Jeurissen, Mortsel, and André Jan Conix, Antwerp, Belgium, assignors to Gevaert-Agfa N.V., Mortsel, Belgium, a company of Belgium
No Drawing. Filed Oct. 19, 1967, Ser. No. 676,644
Claims priority, application Great Britain, Oct. 21, 1966, 47,400/66
Int. Cl. C08g 17/015
U.S. Cl. 260—75                                    7 Claims

ABSTRACT OF THE DISCLOSURE

An improved process of preparing polyesters of terephthalic acid and a glycol utilizing a separately formed catalytic solution of a glycol and germanium dioxide during the polymerization step is described. The catalytic soultion is formed by heating germanium dioxide and glycol at the boiling point of the glycol and at atmospheric pressure and distilling at least 5 percent of the liquid and the resultant catalyst solution is added to the polycondensation reaction mixture in a quantity sufficient to have present in said polycondensation reaction mixture at least 0.005 percent by weight of dissolved germanium dioxide with respect to the weight of glycol terephthalate.

---

The present invention relates to a process for the preparation of polyesters of terephthalic acid and glycols, more particularly ethylene glycol, in which the polycondensation reaction is carried out in the presence of a germanium compound as catalyst.

It is known from the United States Patent Specification 2,578,660 to use germanium dioxide as catalyst in the abovementioned polycondensation reaction. Though high molecular weight compounds can be prepared with germanium dioxide as catalyst, the method described is nevertheless impracticable, due to the very low solubility of crystalline germanium dioxide in the reaction mixture, which results in undissolved catalyst, remaining in the polymer. The low effective catalyst concentration causes long reaction times and the remaining undissolved catalyst will, during working up of the polymer, obviously entail difficulties such as clogging of the filtering apparatus on melting for extrusion purposes. Moreover, filtering off the very fine undissolved catalyst particles is difficult. If the polymer is used for the fabrication of film, the film will contain inclusions in the form of irregularly distributed points or be hazy. This is inadmissible if the film is to be used as a film base for photographic purposes.

A method has now been found for enhancing the solubility of germanium dioxide in the glycol used in the polycondensation step which in practice makes possible the use of germanium dioxide as catalyst in the preparation of such polyesters.

According to the invention a process is provided for the preparation of a polyester of terephthalic acid and a glycol, e.g. ethylene glycol, by polycondensation of a glycol terephthalate in the presence of a germanium compound as catalyst, said process comprising the step of separately dissolving germanium dioxide in the glycol by heating germanium dioxide and glycol at the boiling point of the glycol, and distilling at least 5% of the liquid, and adding the catalyst solution obtained to the reaction mixture at last during the polycondensation of the glycol terephthalate in such a quantity so as to have present in the polycondensation reaction at least 0.005% by weight of dissolved germanium dioxide with respect to the weight of glycol terephthalate.

The preparation of polyesters comprises a reaction resulting in the formation of a glycol terephthalate followed by a polycondensation reaction resulting in the formation of high polymers.

The glycol terephthalates are mostly obtained by a transesterification reaction between the glycol and a lower akyl ester of terephthalic acid e.g. dimethyl terephthalate. However, other methods for preparing the glycol terephthalates e.g. direct esterification of terephthalic acid and glycol, or conversion of terephthalic acid and ethylene oxide, are not excluded. In the transesterification reaction any transesterification catalyst can be used, but preferably one that does not colour the polyester which is to be formed, e.g. compounds of alkali metals and alkaline-earth metals, of praseodymium, cerium and lanthanum, and of salts of zinc, cadmium, or manganese for instance those described in our United Kingdom patent specification 816,215.

The second step in the preparation of polyesters comprises the polycondensation of the glycol terephthalate resulting in the formation of high polymers. This reaction mostly consists of two phases, wherein in the first phase glycol is distilled under stirring at atmospheric pressure and in the second phase the reaction is carried out under a vacuum while the glycol liberated is further distilled. The polycondensation of glycol terephthalate only proceeds to high molecular weights when carried out in the presence of suitable catalysts. When using germanium dioxide as a catalyst its concentration should be at least 0.005% by weight, but normally it is higher and may reach approximately 0.02% by weight of the glycol terephthalate present. Higher concentrations, however, are useless since they do not give rise to a further enhancement of the polycondensation rates. The polycondensation reaction can be carried out either in a continuous process or in a batch procedure.

The catalyst solution prepared according to our invention may be added to the reaction mixture at any of the different steps in the polyester manufacture, but at last during the polycondensation step. In order to have present in the polycondensation step at least 0.005% by weight of dissolved germanium dioxide with respect to the weight of the glycol terephthalate the solution of germanium dioxide in the glycol should at least have a concentration of 0.02% by weight with respect to the glycol.

Much higher concentrations of germanium dioxide, for instance as high as 5% can be prepared according to our invention. On continuing the distillation of the boiling mixture of glycol and germanium dioxide, even solutions with higher concentrations can be prepared. Solutions of higher concentrations are, however, uneconomical, since on cooling there always would exist the risk that a quantity of the germanium dioxide might precipitate in the solution. Perferably the catalyst solution is made up in a concentration of between 0.15 and 1.5% by weight of the glycol. The solutions obtained may be used as stock solutions, which at any time after dilution may serve in the polyester preparation. In this way, the germanium dioxide solution can be added before or during the transesterification and before or during the polycondensation reaction. The catalyst solution of germanium dioxide in glycol prepared according to our invention is preferably added after the formation of the glycol terephthalate before the first phase of the polycondensation step.

The preparation of solutions of the indicated concentrations has the advantage that the minimum size of the apparatus, which is needed for preparing the catalyst solution for one batch of polycondensate, can be kept very small, since the higher the concentration of germanium dioxide which can be realised, the smaller the volume of catalyst solution which has to be added to the polycondensation vessel in order to obtain a predetermined concentration of germanium dioxide calculated on the weight of glycol terephthalate. Alternatively, the solution can be made up in an apparatus of much larger size and be kept as stock solution from which the necessary amount can be added to the first phase of the polycondensation step, calculated so as to reach the desired catalyst concentration in the polycondensation mixture.

The process of making up a stock solution has the advantage that the step of preparing the catalyst solution has not to be carried out each time a batch of polymer is prepared, i.e. a sufficient amount of catalyst solution may be prepared from which aliquots may be taken to effect a number of polycondensation batches.

Normally the necessary amount of stock solution containing dissolved germanium dioxide is added to the reaction medium after the transesterification reaction is completed. The amount of stock solution, however, may as well be added to the glycol needed to form the glycol terephthalate. In order to obtain polyesters of excellent properties, such as a high melting point, it is advantageous that the germanium dioxide be present in the reaction medium at high temperature for a time as short as possible. As a result it is indicated to only add the catalyst solution to the reaction at the beginning of the first phase of the polycondensation step.

When the germanium dioxide has to be present already in a step preceding the polycondensation reaction, e.g., because of the design of the equipment, the catalyst solution could be prepared as described in this invention and added before the transesterification step in the desired amount.

It has been noted that upon keeping germanium dioxide solutions of between 0.6 and 1.5% by weight at room temperature, there is a tendency of the solutions to become cloudy, which finally results in the precipitation of part of the solids. This can be avoided by keeping the stock solution at a temperature above 50° C. or by keeping the stock solution under an atmosphere of pure and dry nitrogen.

The germanium dioxide can be used in the form as supplied, e.g., calcinated and containing only 0.3% of water, non-calcinated and containing up to about 15% of water, or non-calcinated but dried and containing still about 2% of water. The non-calcinated qualities are preferably used.

Certain compounds can also be added to the reaction melt to attain desired effects. For instance stabilising agents such as phosphorus compounds, matting agents, or colouring agents such as anthraquinone dyes can be added.

An advantage of our method is the low temperature required on dissolving the germanium dioxide. Compared with other known methods the occurrence of undesired reactions is thereby prevented.

When compared with other known polycondensation catalysts such as antimony compounds, titanium compounds and tin compounds, the germanium compounds, used in the procedure according to our invention, have the advantage of allowing the preparation of nearly colourless and very clear polyesters. If the polyester is intended for the preparation of films to be used as photographic supports, this clearness and absence of colour is of utmost importance. Another advantage of the use of germanium compounds as polycondensation catalysts resides in the fact that the films prepared from the polyesters have very good stretching properties.

In the examples given hereinafter the increase of the solubility of germanium dioxide in a glycol is described especially with respect to ethylene glycol and to the preparation of polyethylene terephthalate. However, according to the same process the solubility of germanium dioxide in other glycols e.g. 1,4-di(hydroxymethyl)-cyclohexane can be increased. In this way a large number of different nearly colourless and very clear polyesters can be prepared, since the terephthalic acid itself can be replaced partially in the reaction by other dibasic acids such as for instance disophthalic acid, sebacic acid, or adipic acid.

The following examples are cited to illustrate the invention. In these examples the inherent viscosity $\eta_{inh}$, which is a measure of the degree of polycondensation, is calculated from the equation:

$$\eta_{inh} = \frac{\ln \eta_{rel}}{c}$$

wherein $\eta_{rel}$ (the relative viscosity) is found from $$\eta_{rel} = \frac{\text{flow time of the solution}}{\text{flow time of the solvent}}$$

and wherein $c$ is the concentration.

$\eta_{rel}$ is determined at 25° C. for a solution having a concentration $c$ of 0.5 g. of polyester per 100 cc. of a 60:40 mixture of phenol and sym.-tetrachloroethane.

The crystalline melting point of the polymer is determined by heating a crystallised sample of polyester on the heating stage of a polarising microscope. The temperature of the hot stage is raised at a rate of 0.8° C./min. The crystalline melting point is the temperature at which between crossed nicols the last trace of birefringence disappears.

At the end of the ploycondensation period the colour of the molten polyester is measured in a Lovibond Tintometer and recorded in terms of the Lovibond scale. This scale consists of permanent glass filters graduated in a strictly linear scale, from the palest perceptible colour to a fully saturated one, in the three subtractive primary colours red, yellow, and blue. By selecting suitable combinations from these scales, any colour, as well as grey to black, can be matched. This method has been described in "Colorimetric Chemical Analytical Methods," 2 volumes of a loose-leaf text bok published by the Tintometer Ltd., Salisbury, England.

Example 1

A catalyst solution was made by heating while stirring the mixture of 0.5 g. of germanium dioxide and 150 ccs. of ethylene glycol at the boiling temperature of ethylene glycol (197° C.) and distilling 50 ccs. of the liquid. A clear 0.5% solution was obtained.

38.8 parts of dimethyl terephthalate (0.2 mole) and 27.3 parts of ethylene glycol (0.14 mole) were placed in a 25 millimeter inside diameter glas polymerisation tube, and 8.2 mg. of manganese monomethyl terephthalate ($1.10^{-4}$ mole/mole of dimethyl terephthalate) prepared as described in Example 1 of United Kingdom patent specification 816,215, together with 0.42 cc. of the 0.5% germanium dioxide solution, containing 2.1 mg. of germanium dioxide ($1.10^{-4}$ mole/mole of dimethyl terephthalate) were added. The reactants were heated for 2 hours at 197° C. under atmospheric pressure. A continuous stream of dry nitrogen was introduced through a capillary tube reaching to the bottom of the reaction tube. The transesterification being finished, the temperature was gradually raised over 30 min. to 282° C. and the unreacted ethylene glycol distilled. The pressure was reduced to 0.1 to 0.3 millimeter of mercury pressure while the melt was stirred under dry nitrogen. After 3 hours at 282° C., vacuum was released and polyethylene terephthalate polyester was obtained having an inherent viscosity of 0.62. The polyester was clear, had a Lovibond colour combination of 0.3 red and 1.6 yellow, and melted at 265° C. which indicates a low diethylene glycol content.

Example 2

38.8 parts of dimethyl terephthalate (0.2 mole) and 27.3 parts of ethylene glycol (0.44 mole) were placed in a 25 millimeter inside diameter glas polymerisation tube, and 9.8 mg. of manganese acetate tetrahydrate ($2.10^{-4}$ mole/mole of dimethyl terephthalate) were added. The reactants were heated for 1¼ hours at 197° C. under atmospheric pressure. A continuous stream of dry nitrogen was introduced through a capillary tube reaching to the bottom of the reaction tube. The transesterification being finished, 0.84 cc. of a 0.5% solution of germanium dioxide in ethylene glycol, containing 4.2 mg. of germanium dioxide ($2.10^{-4}$ mole/mole of dimethyl terephthalate) and prepared as described in the first lines of Example 1, was added. Then, the temperature was gradually raised over 30 min. to 282° C. and the unreacted ethylene glycol distilled. The pressure was reduced to 0.1–0.3 mm. Hg, while the melt was stirred under dry nitrogen. After 2 hours at 282° C., vacuum was released and polyethylene terephthalate polyester was obtained having an inherent viscosity of 0.69. The polyester was clear, had a Lovibond colour combination of 0.2 red, and 1.4 yellow, and melted at 266° C., which indicates a low diethylene glycol content.

Example 3

The process of Example 2 was repeated with the sole difference that together with the germanium dioxide solution 12 mg. of triphenyl phosphite ($2.10^{-4}$ mole/mole of dimethyl terephthalate) was added as stabilizer. The polyester obtained had an inherent viscosity of 0.64, was clear and had a Lovibond colour combination of 0.1 red and 0.7 yellow. It melted at 267° C. which indicates a low diethylene glycol content.

Example 4

The process of Example 1 was repeated, however, after the 8.2 mg. of manganese monomethyl terephthalate had been replaced by 4.4 mg. of zinc acetate dihydrate ($1.10^{-4}$ mole/mole of dimethyl terephthalate). The inherent viscosity of the polyester obtained was 0.64. The polyester was clear and had a Lovibond colour combination of 0.5 red and 2.0 yellow. It melted at 264.5° C., which indicates a low diethylene glycol content.

Example 5

The process of Example 1 was repeated, however, after the 8.2 mg. of manganese monomethyl terephthalate had been replaced by 3.3 mg. of praseodymuim oxide ($5.10^{-5}$ mole/mole of dimethyl terephthalate). The inherent viscosity of the polyester obtained was 0.66. The polyester was clear and had a Lovibond colour combination of 0.4 red and 1.6 yellow. It melted at 265.5° C., which indicates a low diethylene glycol content.

Example 6

A catalyst solution was prepared by heating a mixture of 4.5 g. of germanium dioxide and 1500 ccs. of ethylene glycol at the boiling point of the latter and distilling 1200 ccs. of the liquid. A clear 1.5% solution was obtained.

21 kg. of dimethyl terephthalate and 14.7 kg. of ethylene glycol were placed in a stainless steel autoclave, equipped with a stirrer and a rectifying column. After the addition of 4.46 g. of manganese monomethyl terephthalate, the mixture was stirred and heated for 2½ hours at 160–215° C. until the theoretical amount of methanol was separated. The transesterification being finished, 184 ccs. of the above 1.5% solution of germanium dioxide in ethylene glycol, containing 2.26 g. of germanium dioxide was added, together with 7.04 g. of triphenyl phosphate as stabilizer.

Subsequently the temperature was raised to 250° C. and for 1½ hours the unreacted ethylene glycol distilled. Then the pressure was reduced to 0.5 mm. of Hg. After 4 hours of condensation at 260–280° C., vacuum was released and polyethylene terephthalate was obtained having an inherent viscosity of 0.69. The polyester was clear and had a Lovibond colour of 0.5 yellow. It melted at 265.5° C., which indicates a low diethylene glycol content.

Example 7

A catalyst solution was prepared by heating a mixture of 2.5 g. of germanium dioxide and 350 ccs. of ethylene glycol at the boiling point of the latter and distilling 300 ccs. of the liquid. A clear 5% solution was obtained.

Then the further process of Example 6 was repeated with the difference, however, that the 184 ccs. of 1.5% solution of germanium dioxide were replaced by 55.2 ccs. of the 5% solution prepared above.

The polymer obtained had equally good properties as that prepared in Example 6.

We claim:
1. In a process for the preparation of film-forming polyesters of terephthalic acid and glycols by the polycondensation of a glycol terephthalate in the presence of a solution of germanium dioxide in glycol as catalyst for said polycondensation reaction, the improvement comprising enhancing the solubility of germanium dioxide in the glycol by separately heating germanium dioxide and glycol at the boiling point of the glycol and at atmospheric pressure and distilling off at least 5% of liquid, said glycol being the same as that used in the preparation of the glycol terephthalate, adding the resultant catalyst solution wherein the germanium dioxide is dissolved in the glycol at a concentration of at least about 0.02 percent by weight, based on the weight of said glycol to the polycondensation reaction mixture at the latest during the polycondensation of the glycol terephthalate and in a quantity sufficient to have present in said polycondensation reaction mixture at least 0.005 percent by weight of dissolved germanium dioxide with respect to the weight of glycol terephthalate, and polycondensing said glycol terephthalate.

2. The process of claim 1 wherein the catalyst solution is added to the polycondensation reaction mixture after a glycol-terephthalate is formed.

3. The process of claim 6 wherein the catalytic solution is added to the polycondensation reaction mixture prior to the formation of a glycol-terephthalate.

4. The process of claim 1 wherein the germanium dioxide is dissolved in the glycol at a concentration of from about 0.15 to 1.5 percent by weight, based on the weight of the glycol.

5. The process of claim 1 wherein the glycol is ethylene glycol.

6. A process for the preparation of a catalytic solution of germanium dioxide and glycol, said solution having up to about 1.5 percent germanium dioxide on a weight basis comprising the steps of heating the germanium dioxide and glycol at the boiling point of the glycol and at atmospheric pressure and distilling at least 5 percent of the glycol.

7. The process of claim 6 wherein the glycol is ethylene glycol.

References Cited

UNITED STATES PATENTS 2,465,319  3/1949  Whinfield et al. _____ 260—75
2,951,060  8/1960  Billica _____ 260—75
3,346,541  10/1967  Davies _____ 260—75

WILLIAM H. SHORT, Primary Examiner

LOUISE P. QUAST, Assistant Examiner

U.S. Cl. X.R.

252—430; 260—475

UNITED STATES PATENT OFFICE
CERTIFICATE OF CORRECTION

Patent No. 3,497,474      Dated February 24, 1970

Inventor(s) Lambert Gaston Jeurissen, et al

It is certified that error appears in the above-identified patent and that said Letters Patent are hereby corrected as shown below:

Column 2, line 36, delete "The" and insert "This"; column 4, line 4, delete "disophthalic" and insert -- isophthalic --; column 4, line 19, delete "cc." and insert -- ccs. --; column 6, line 42, delete "6" and insert -- 1 --.

SIGNED AND SEALED
OCT 8 - 1970

(SEAL)
Attest:

Edward M. Fletcher, Jr.
Attesting Officer

WILLIAM E. SCHUYLER, JR.
Commissioner of Patents